United States Patent [19]

James

[11] 3,998,284
[45] Dec. 21, 1976

[54] INVALID HOISTS

[75] Inventor: David Richard James, Hasfield, England

[73] Assignee: Mecanaids Limited, England

[22] Filed: July 1, 1975

[21] Appl. No.: 592,270

[30] Foreign Application Priority Data

July 26, 1974 United Kingdom ............ 33057/74

[52] U.S. Cl. .................................. 177/147; 5/86; 177/144
[51] Int. Cl.² .................... G01G 19/44; A61G 7/10
[58] Field of Search .......... 177/139, 140, 147, 148, 177/145, 144, 129; 5/83, 86, 87, 88, 81

[56] References Cited

UNITED STATES PATENTS

| | | | |
|---|---|---|---|
| 2,419,217 | 4/1947 | Isenberg | 177/210 |
| 2,450,281 | 9/1948 | Hudson | 177/147 |
| 3,032,131 | 5/1962 | Schmerl | 177/129 |
| 3,109,179 | 11/1963 | Miller et al. | 5/81 R |
| 3,310,816 | 3/1967 | James et al. | 5/83 |

*Primary Examiner*—Joseph W. Hartary
*Attorney, Agent, or Firm*—Cushman, Darby & Cushman

[57] ABSTRACT

A hoist for lifting and weighing a disabled person comprises a chassis supporting an upstanding column from which a lifting arm projects. The arm can be raised and lowered by means of elevating mechanism associated with the column, and a patient to be lifted, transported and/or weighed can be supported by a patient support member fitted at the end of the arm remote from the column. Weighing means fitted at the top of the column are responsive during weighing to the weight of the arm, including the supported load, at the column.

10 Claims, 3 Drawing Figures

INVALID HOISTS

BACKGROUND OF THE INVENTION

This invention relates to means for lifting patients and disabled persons generally and of the general class commonly referred to as "invalid hoists", and especially to means for weighing patients while supported in an invalid hoist. It is of particular, but by no means exclusive, application to hoists for use in hospitals and institutions for weighing infirm and disabled patients, thereby relieving nursing staff of the effort normally involved in manhandling patients on to and off conventional weighing machines.

SUMMARY OF THE INVENTION

The invention has for an object to provide means for lifting and weighing a disabled person, comprising an upstanding column, a lifting arm projecting from the column, elevating mechanism associated with the column and operative to raise and lower the arm, and weighing means which are responsive to the weight of the arm and any load supported therefrom. The supported load, in use, will comprise the patient and a patient support member, such as a seat or sling, attached to the arm and by which the patient is supported.

The column is preferably disposed generally vertically with the weighing means mounted or mountable on the column; however, the weighing means may alternatively be mounted or mountable on the arm itself for direct or indirect operative weighing connection with the column.

The weighing means may be directly responsive to the stress or strain in an element of the elevating mechanism which stress or strain is directly related to the total arm and load weight at the column, for example the tension in a lifting chain of the mechanism. Alternatively, the weighing means may be arranged to take the weight of the arm and load directly with the elevating mechanism relieved of that weight, in which case it may be a spring balance mechanism attached or attachable to the top of the column with a sling or strap of variable effective length by which the arm is supported during the weighing operation, the strap preferably being wound up on a self-reeling inertia-locking reel device. The sling or strap can then perform a double function, normally acting as a safety strap to check fall of the arm in the event of any failure of the elevating mechanism, and the weighing means may be designed as an attachment for an existing invalid hoist. Inertia-locking reels, as such, are well known and are commonly used, for example, with motor car safety straps and harnesses.

Thus, according to another object, the invention provides a weighing attachment for fitting to the column of an existing invalid hoist, the attachment including means for coupling directly or indirectly to the arm of the hoist in such manner as to support the total weight of the arm and supported load through the weighing attachment instead of by the normal elevating mechanism associated with the column.

It will be appreciated that the invention is of application to invalid hoists generally; in particular, to either static hoists which may, for example, be mounted alongside a bath or to mobile hoists having a wheeled chassis. The arm may include a carriage movable within a tubular column generally as in the hoist described in U.S. Pat. No. 3,310,816 in the name of the assignees of the present application. In that case the weighing means may either be responsive to the tension in the lifting chain connected to the carriage or be a removable attachment, as described, which fits on to the top of the column and in use is connected directly to the arm of the hoist.

Other features of the present invention will appear more fully below from the following detailed description considered in connection with the accompanying drawings which disclose two embodiments of the invention. It is to be expressly understood, however, that the drawings are designed for purposes of illustration only and not as a definition of the limits of the invention, reference for the latter purpose being had to the appended claims.

DESCRIPTION OF THE PREFERRED EMBODIMENTS

Figures 1, 2:
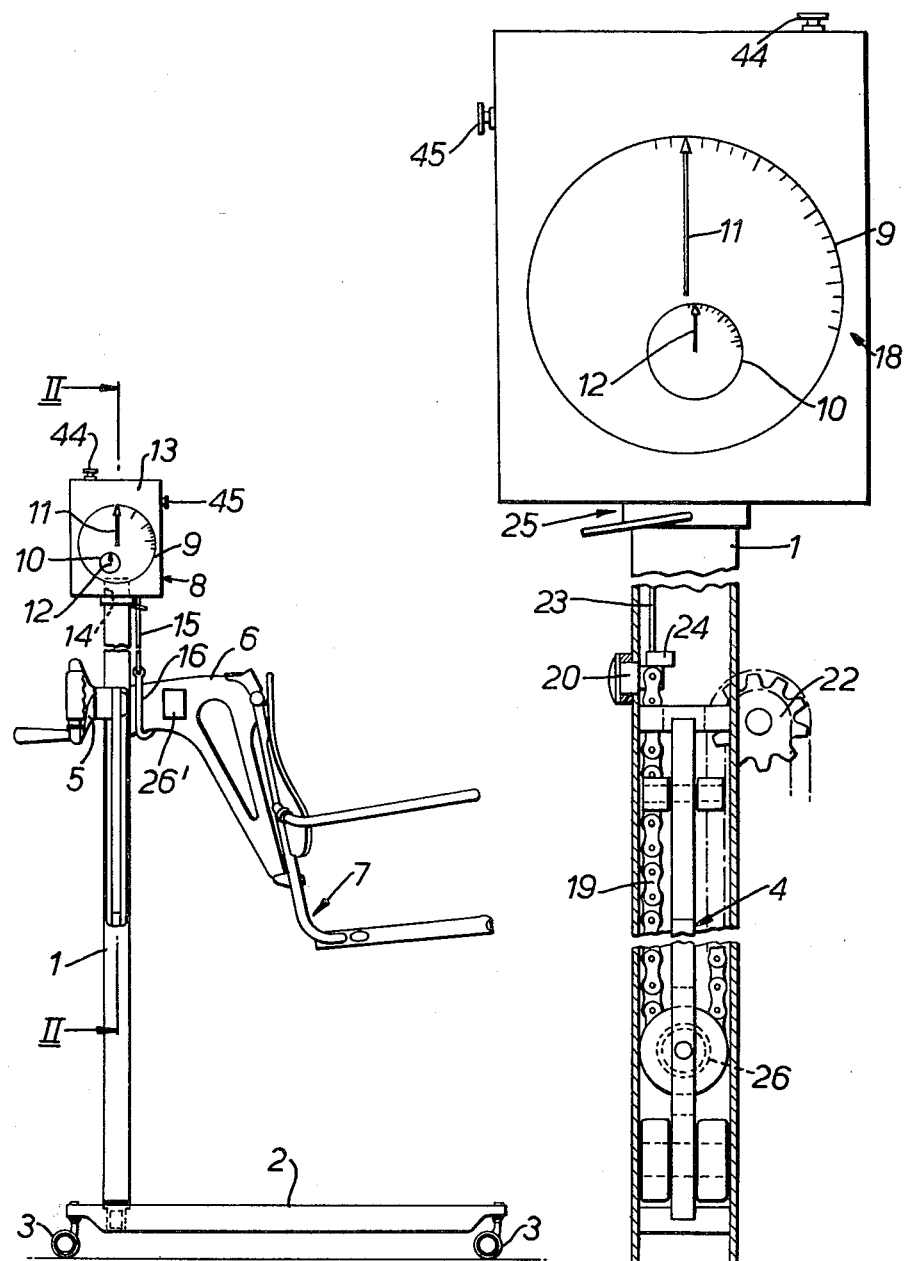
FIG. 1 is a side view of a hoist with one weighing attachment in accordance with the invention.
FIG. 2 is a part-sectional partial view of a mast of the hoist taken on the line II—II in FIG. 1, with another weighing attachment in accordance with the invention.

The drawings illustrate two modes of applying the invention to the construction of hoist illustrated in the aforesaid U.S. Pat. No. 3,310,816. In each case only relevant parts of the hoist are shown, and the operation and general construction of the basic hoist is as described in said prior patent, to which reference should be made if a more detailed explanation than that which follows is required.

The basic hoist structure comprises a vertical column or mast 1 mounted on a mobile chassis 2 provided with four corner castors 3. The column is mounted adjacent the rear and centrally of the chassis. The column 1 is of rectangular box section and houses a carriage 4 which runs up and down the column under the control of a manually operable lifting mechanism with a winding handle 5. A cantilever arm 6 is attached to the carriage 4 and projects from the column through a longitudinal slot at the front side thereof. A rigid patient support member, in the form of a legless chair 7, is detachably supported at the end of the arm 6 and has a "hook-on" connection therewith.

The weighing arrangement of FIG. 1 employs an attachment for the basic hoist, which attachment comprises a weighing mechanism 8 of the spring balance type with two graduated scales 9 and 10 and pointers 11 and 12. As shown the scales are arranged to be viewed from either side of the hoist, but it may be found preferable to arrange for viewing from the rear of the hoist. The casing 13 of the weighing mechanism 8 has a bottom mounting socket 14 which fits the top of the column 1.

The weighing scales 9 and 10 in the arrangement of FIG. 1 indicate the weight supported by an extendable strap 15 hanging down from the mechanism 8 forwardly of the column 1, and which, as shown in FIG. 1, has an end attachment hook 16 hooked below the arm 6. The strap 15 is wound on a self-reeling inertia-locking reel 17 within the casing 13 of the mechanism 8, and this allows the effective length of the strap 15 to vary freely to suit the height of the arm 6, if the patient is lowered at a normal rate, but rapid extension of the strap 15 locks the inertia mechanism of the reel 17 so that the strap 15 becomes taut and takes the weight of the arm 6, chair 7 and patient.

To weigh a patient on the chair 7 the patient is lowered by turning the handle 5 in the appropriate direction, while the strap 15 is subjected to a quick pull by hand, so that the rapid strap movement locks the reel 17. Thus the weight of the arm 6, chair 7 and patient is transferred from the lifting mechanism to the weighing mechanism 8, the scales of which indicate the total weight. By a separate weighing of the arm 6 and chair 7 the weight of the patient can readily be calculated by subtraction from the total weight.

The inertia reel 17 may according to a modification have manually-operable locking means for use during weighing instead of relying on activation of the inertia mechanism. Such locking means are not illustrated and may, for example, comprise a locking pin or plunger on the side of the reel 17 and which is depressed by means of an externally accessible actuating member before a patient is weighed.

If desired the weighing scales 9 and 10 can be calibrated directly in terms of patient weight for a known weight of arm and chair, but it is more convenient to have a universal scale which allows the chair 7 to be replaced by another patient support member such as, for example, a suspension sling or stretcher arrangement. For such purposes a suppressed zero scale 9 may be provided, the pointer 11 being manually zeroed during an initial weighing of the arm and patient support means complete but without the patient. In a subsequent weighing with the patient the weight of the latter is then directly indicated on the scale.

When not in use for weighing a patient the strap 15 may be left hooked beneath the arm 6, so that the weighing mechanism 8 is not loaded during normal movement but, in the event of failure of the lifting mechanism, the strap 15 becomes taut and acts as a safety strap to check the fall of the arm. The construction just described with reference to FIG. 1 has the advantage that the weighing attachment is structurally independent of the basic hoist. Thus it can be removed when not in use, the same attachment can be used with a number of similar hoists, and it can furthermore be purchased separately and fitted without any modification of the hoist mechanism being required.

As an alternative to the inertia reel and strap described a simple link, not illustrated and hooked to the arm, may be used to transfer the weight to the weighing mechanism. In this case weighing must be effected at a fixed height and the link unhooked during normal use of the hoist, and the safety strap feature is not provided.

The weighing mechanism 18 of FIG. 2 is similarly an attachment which can be fitted to an existing hoist, again fitting on the top of the column 1. In this case, however, it is shown fitted for rear viewing and is not a readily removable attachment, and some internal modification of the hoist mechanism is required. The lifting mechanism employs a roller chain 19 which in the basic hoist is anchored to the column 1 at 20 and looped beneath an idler pulley 26 on the carriage 4. The chain 19 passes over a driving sprocket 22 which is coupled to the operating handle 5. Thus, neglecting friction which in the construction illustrated is negligible, the tension in the chain 19 equals half the weight of the carriage 4, arm 6, chair 7 and patient.

On fitting of the mechanism 18 the chain 19 is detached from its anchorage and is instead attached to a weighing element 23 which is a link hanging down the column from the mechanism 18. This link corresponds to the strap 15 of FIG. 1, and thus at all times the scales and pointers 9,11; 10,12 provide an indication of chain tension and hence the total weight inclusive of the carriage 4 supported by the lifting mechanism. The anchor pin of the hoist at 20 is replaced by a fixed stop which cooperates with a projection 24 at the bottom end of the link 23. This stop limits movement of the link 23 and thus protects the weighing mechanism 18 from excessive and shock loads. It will be appreciated that the link 23 replaces both the strap 15 and the inertia reel of the FIG. 1 arrangement.

The mounting of the mechanism 18 may include manually operated lifting means indicated diagrammatically at 25 which lift the mechanism and raise the projection 24 from the fixed stop at 20 when a patient is to be weighed. In this case the projection 24 rests on the stop at all other times, and the weighing mechanism is unstressed and not subject to shock during normal use of the hoist.

As has been mentioned the hoist construction illustrated can be manufactured such that friction of the carriage 4 in the column 1 can be ignored, within the normally required limits of patient weighing accuracy. For extreme accuracy a vibratory device illustrated diagrammatically at 26' may be fitted to vibrate the arm, or alternatively the column, when a weight reading is to be taken, the vibration overcoming static friction or "stiction". Such a vibrator may be a clock-work attachment which, on being wound up, vibrates the column for a few second with the vibration having a vertical component to excite the sprung mass and resulting from the rotation of an unbalanced mass.

It will be appreciated that the true weight is theoretically only indicated when a vertical loading is applied to the weighing mechanism 8 or 18. Thus weighing should be carried out on a substantially horizontal floor surface although, as the weighing error is proportional to the cosine of the inclination of the column 1 to the vertical, a floor slope of less than five degrees will have relatively little effect on the weighing accuracy.

As the load is cantilevered from the column 1, increasing patient weight produces a progressive deflection of the column 1. Should this deflection become substantial with a particular hoist construction an appropriate non-linear calibration of the weighing scale 9 can be made. However, in general this deflection will be less than five degrees and hence can again for normal purposes be ignored The embodiment of FIG. 2 provides, in particular, the facility of very accurate weighing of a patient such as is essential in medical procedures such as dialysis. As the chain tension is half the total supported weight at the column, including that of the arm, a correspondingly more sensitive weighing mechanism can be used but, for extreme accuracy, the construction must be such that the chain tension is exactly half the total weight. To this end the pulley 26 is desirably a chain sprocket with an even pitch, i.e. an even number of teeth, to ensure that the ratio of chain tension to supported weight remains constant. This, together with the vibrator 26', enables precise weighing to be achieved with a high degree of accuracy.

Figure 3:
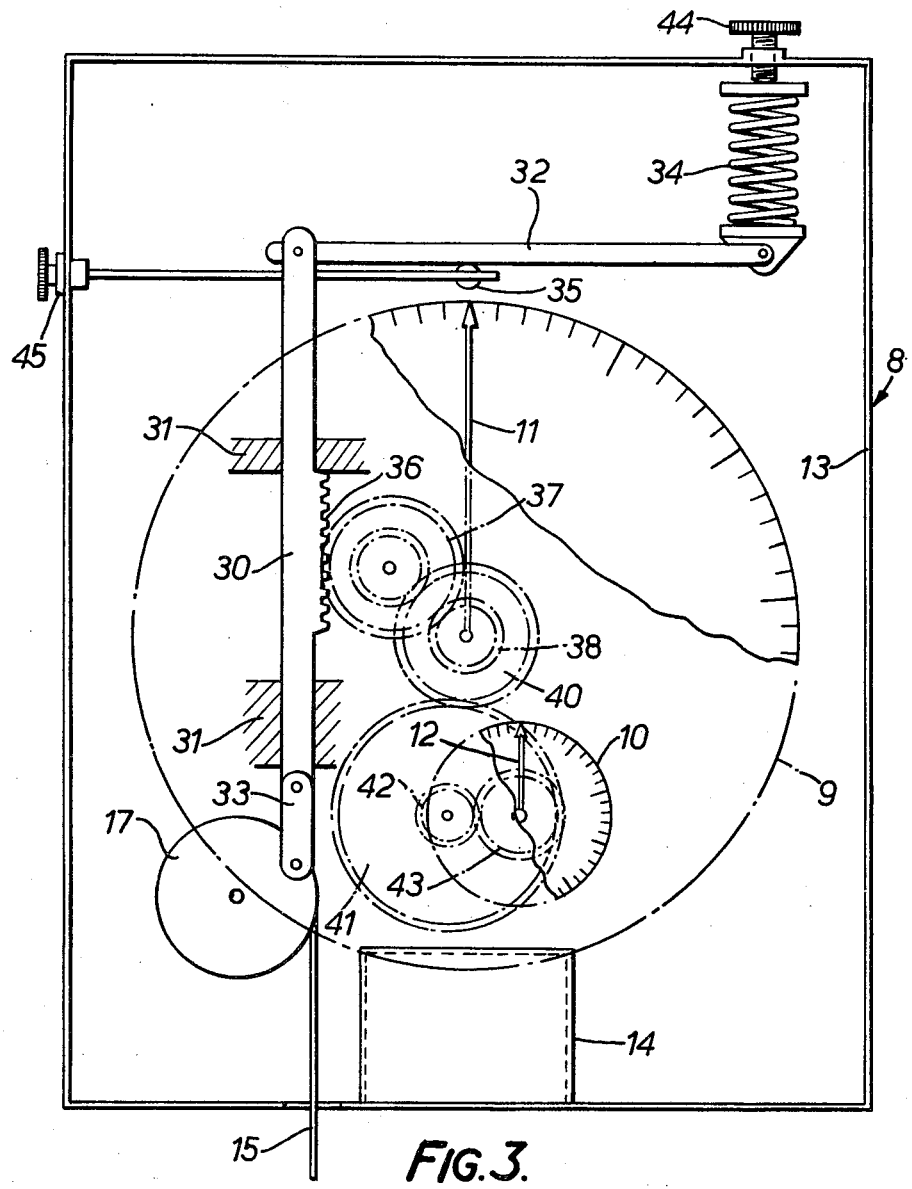
FIG. 3 is a diagrammatic illustration of the internal mechanism of the weighing attachments of FIGS. 1 and 2.

It will be appreciated that the construction of the weighing mechanism itself can take any one of many forms well known in the weighing machine art. The construction shown diagrammatically in FIG. 3 is merely intended as a typical example of a mechanism which could suitably be employed, shown as adapted for use with the weighing arrangement of FIG. 1. In a more sophisticated device, by way of further example, the weighing means may employ an electrical strain gauge with a digital readout.

A vertically slidable rack 30 is guided in spaced bearings 31 and at the upper end is pivotally attached to a lever 32 providing a weigh-beam. A link 33 is pivotally attached at its ends, respectively, to the bottom end of the rack 30 and to the portion of the inertia reel 17 which is normally not coupled to the strap 15. Counterloading of the lever 32 is provided by a compression spring 34, the lever being mounted on a low-friction pivot 35 intermediate its ends.

Application of a vertical load to the rack 30 on locking of the inertia reel 17 pivots the lever 32 anti-clockwise as seen in FIG. 3, where the mechanism is viewed from the opposite side as compared with FIG. 1. This produces corresponding deflection of the pointers 11 and 12, the scale 9 being calibrated for example in 10 Kgm. main divisions sub-divided into 1 Kgm. divisions with the scale 10 covering a 1 Kgm. range sub-divided into 1 gm. divisions. The gear transmission between the rack 30 and the pointers 11 and 12 will now be briefly described.

The rack teeth 36 drive a pinion 37 which in turn drives a smaller pinion 38 to which the pointer 11 is attached. The pinion 37 is one of a gear pair 37,39, and the pinion 39 drives a larger idler pinion 40 which in turn drives the larger pinion 41 of a gear pair 41,42, the smaller pinion 42 of which drives a larger pinion 43 to which the pointer 12 is attached.

A zero-adjust knob 44 at the top of the casing 13 can be screwed in or out, to vary the positioning of the weighing spring 34, for the purpose of zero adjustment. A calibration knob 45 at one side of the casing can be screwed in or out to move the pivot 35 horizontally with respect to the lever 32, thereby varying the effective leverage between the rack 30 and the spring 34.

The scales and pointers 9,11 and 10,12 are duplicated on opposite sides of the casing 13 so that the mechanism can be viewed from either side of the hoist. For use in the arrangement of FIG. 2 the strap 15 and inertia reel 17 are suitably replaced with the link 23 as decribed, this link being connected to the rack 30 and positioned to hang down into the column 1 for attachment to the upper end of the chain 19.

The spring 34 may be chosen either to provide a true zero for the scale 9 or, as previously described, a suppressed zero so that only the patient weight is indicated: or the range of zero adjustment provided by the zero-adjust knob 44 may be sufficient to provide either of these conditions as desired.

Obviously many changes and modifications may be made without departing from the spirit of the invention; and all such changes and modifications are intended to be included within the scope of the appended claims.

I claim:

1. Means for lifting and weighing a disabled person, comprising an upstanding column, a lifting arm projecting from the column, elevating mechanism associated with the column and operative to raise and lower the arm, and weighing means mounted on the column and directly responsive to the stress or strain in an element of the elevating mechanism, which stress or strain is directly related to the total arm weight at the column whereby the weighing means are responsive to the weight of the arm and any load supported therefrom.

2. Means according to claim 1, wherein a vibratory device operates to vibrate the arm to overcome static friction when a weight reading is to be taken.

3. Means according to claim 1, wherein the weighing means is directly responsive to the tension in a lifting chain of the elevating mechanism and is connected to one end of the lifting chain.

4. Means according to claim 3, wherein the weighing means is associated with a lifting device which raises the weighing means to an operative weighing position, the lifting device having a lowered inoperative position in which the weighing means is relieved of the chain loading which is taken by a fixed stop.

5. Means according to claim 3, wherein the column is tubular and the arm includes a carriage movable within the column, the lifting chain is looped beneath an idler sprocket on the carriage whereby the chain tension to which the weighing means is directly responsive is half the weight of the arm and supported load, and the idler sprocket has an even number of teeth.

6. Means for lifting and weighing a disabled person, comprising an upstanding column, a lifting arm projecting from the column, elevating mechanism associated with the column and operative to raise and lower the arm, and weighing means arranged when in use to take the weight of the arm directly with the elevating mechanism relieved of that weight so that the weighing means are responsive to the weight of the arm and any load supported therefrom.

7. Means according to claim 6, wherein the weighing means is attached or attachable adjacent the top of the column and has a sling or strap, or other tension member, by which the arm is supported during s weighing operation.

8. Means according to claim 7, wherein the sling or strap is associated with an inertia-locking reel type of mechanism so as to be of variable effective length, to allow weighing of a person at different heights.

9. Means according to claim 7, wherein the sling or strap can be hooked underneath the arm, or otherwise detachably connected to the arm, so as to be readily detachable when the weighing means is not in use.

10. A weighing attachment for fitting to an invalid hoist of the type comprising an upstanding generally vertical column, a lifting arm projecting from the column, and an elevating mechanism associated with the column and operative to raise and lower the arm, which attachment is adapted for fitting to the column and includes means for coupling directly or indirectly to the arm of the hoist in such manner as to support the total weight of the arm and supported load through the weighing attachment instead of by the elevating mechanism as in normal use of the hoist.

* * * * *